US005488858A

United States Patent [19]

Achleitner

[11] Patent Number: 5,488,858

[45] Date of Patent: Feb. 6, 1996

[54] METHOD FOR MONITORING LAMBDA SENSORS

[75] Inventor: Erwin Achleitner, Regensburg, Germany

[73] Assignee: Siemens Aktiengesellschaft, Munich, Germany

[21] Appl. No.: 212,972

[22] Filed: Mar. 15, 1994

[30] Foreign Application Priority Data

Mar. 15, 1993 [EP] European Pat. Off. .............. 93104163

[51] Int. Cl.[6] .................................................... G01M 19/00

[52] U.S. Cl. ............................... 73/118.1; 73/1 G; 73/116

[58] Field of Search ........................... 73/1 G, 116, 118.1

[56] References Cited

U.S. PATENT DOCUMENTS 3,938,075 2/1976 Reddy .
4,177,787 12/1979 Hattori et al. .
4,191,151 3/1980 Wanamaker .
4,574,627 3/1986 Sakurai et al. ............................ 73/116
4,750,353 6/1988 Wright et al. .......................... 73/118.1
4,782,690 11/1988 Terasaka .................................. 73/116
4,878,381 11/1989 Moser et al. ........................... 73/118.1
4,953,390 9/1990 Krempl et al. ............................ 73/116
4,975,846 12/1990 Abe et al. ................................ 73/116
5,027,646 7/1991 Mizutani et al. ...................... 73/118.1
5,065,728 11/1991 Nakaniwa .
5,168,859 12/1992 Ohsaki ...................................... 73/116
5,212,947 5/1993 Fujimoto et al. ...................... 73/118.1
5,269,178 12/1993 Vigmostad et al. ...................... 73/116
5,287,735 2/1994 Klauber et al. ........................... 73/116
5,335,539 8/1994 Sweeppy et al. ...................... 73/118.1

*Primary Examiner*—Kenneth A. Wieder
*Assistant Examiner*—Eric S. McCall
*Attorney, Agent, or Firm*—Herbert L. Lerner; Laurence A. Greenberg

[57] ABSTRACT

A method for monitoring lambda sensors includes ascertaining a reference value from a magnitude of switching times under operating conditions of a lambda regulation cycle, in which a sensor signal changes from a rich value to a lean value or from a lean value to a rich value. A sensor is classified as functioning correctly if the reference value is less than an associated limit value.

12 Claims, 1 Drawing Sheet

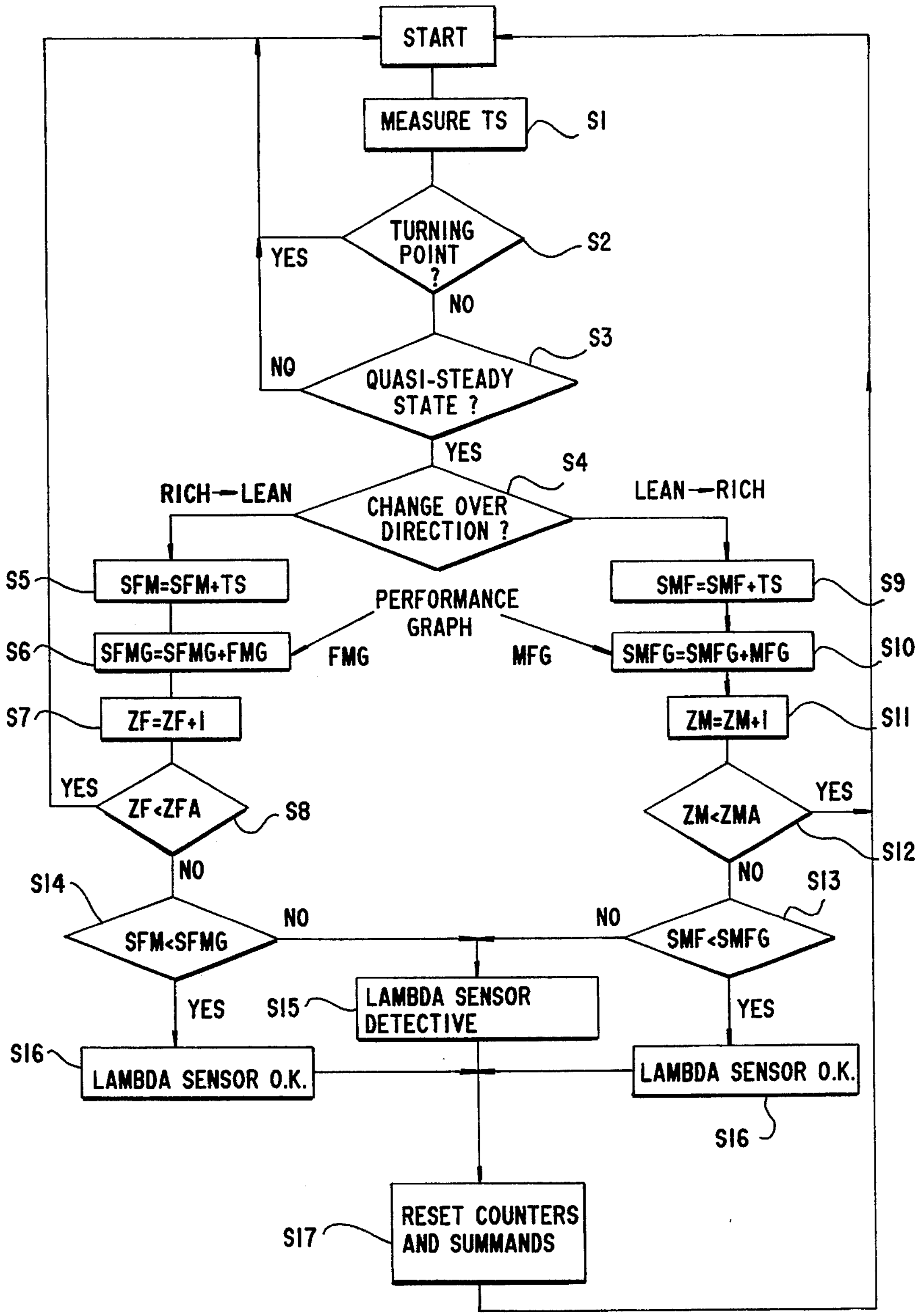
START
MEASURE TS
S1
TURNING POINT ?
S2
YES
NO
QUASI-STEADY STATE ?
S3
NO
YES
CHANGE OVER DIRECTION ?
S4
RICH→LEAN
LEAN→RICH
SFM=SFM+TS
S5
SMF=SMF+TS
S9
PERFORMANCE GRAPH
FMG
MFG
SFMG=SFMG+FMG
S6
SMFG=SMFG+MFG
S10
ZF=ZF+1
S7
ZM=ZM+1
S11
YES
ZF<ZFA
S8
NO
ZM<ZMA
YES
S12
NO
S14
SFM<SFMG
NO
NO
SMF<SMFG
S13
YES
YES
S15
LAMBDA SENSOR DETECTIVE
S16
LAMBDA SENSOR O.K.
LAMBDA SENSOR O.K.
S16
S17
RESET COUNTERS AND SUMMANDS

METHOD FOR MONITORING LAMBDA SENSORS

BACKGROUND OF THE INVENTION

Field of the Invention

The invention relates to a method for monitoring the functional capability of lambda sensors, in which switching times of the lambda sensor are measured.

In internal combustion engines, pollutant emissions can be reduced by catalytic post-treatment.

A prerequisite of catalytic post-treatment is a certain composition of the exhaust gas, which is known as a stoichiometric mixture. That purpose is served by mixture regulation by means of a so-called lambda sensor, by which the mixture composition is periodically regulated within close limits around a command or setpoint value. To that end, if the fuel/air mixture is rich, the sensor outputs a high voltage (the rich voltage), and if the fuel/air mixture is lean, it outputs a low voltage. A voltage jump that is characteristic for lambda=1 is located between those voltages.

The sensors may become defective in the course of operation, causing the mixture composition to be incorrectly regulated. In that case the exhaust gases are no longer correctly detoxified, and over the long term the catalyst is even damaged as a result.

It is therefore necessary to monitor the functional capability of the lambda sensor.

Summary of the Invention

It is accordingly an object of the invention to provide a method for monitoring lambda sensors, which overcomes the hereinafore-mentioned disadvantages of the heretofore-known methods of this general type and which makes it possible to reliably monitor a dynamic functional capability of a lambda sensor.

With the foregoing and other objects in view there is provided, in accordance with the invention, a method for monitoring lambda sensors, which comprises ascertaining a reference value from a magnitude of switching times under operating conditions of a lambda regulation cycle, in which a sensor signal changes from a rich value to a lean value or from a lean value to a rich value, and classifying a sensor as functioning correctly if the reference value is less than an associated limit value.

This is done by measuring the switching times within which the lambda sensor, in the context of its jump function, switches over from the high voltage value (rich voltage) that characterizes a rich mixture to a lower voltage value (lean voltage) that indicates a lean mixture. The switching times for the reverse jump from "lean" to "rich" are also measured. The magnitude of these switching times is a measure of the functional capability of the lambda sensor. If the switching times are above a limit value ascertained beforehand on a test bench using correct lambda sensors, or if they are equivalent to this limit value, the lambda sensor is defective. If the switching times are below the limit value, then the lambda sensor is functioning correctly. The limit values are dependent on the engine operating point and are therefore taken from a performance graph, for instance as a function of the aspirated air and the rpm of the engine.

In order to monitor the switching times, it is necessary for the engine to be in a virtually steady operating state during the test cycle. However, in that state, the testing is possible without disruptively intervening in the lambda regulation.

Other features which are considered as characteristic for the invention are set forth in the appended claims.

Although the invention is illustrated and described herein as embodied in a method for monitoring lambda sensors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing is a flow chart which shows the course of an exemplary embodiment of the method according to the invention.

DESCRIPTION OF THE PREFERRED EMBODIMENTS

Referring now to the single FIGURE of the drawing in detail, there is seen an exemplary embodiment in which it is assumed that with a rich mixture, a lambda sensor outputs a higher voltage value than with a lean mixture. The method of the invention functions analogously with lambda sensors which have the opposite relationship between the voltage and the mixture.

According to the invention, a reference value is ascertained from lambda sensor switching times. In the exemplary embodiment, a plurality of switching times are added together for that purpose, with a separate evaluation being made of the switching times from rich to lean and from lean to rich, and they are compared with an associated limit value.

In a method step S1 a switching time TS that the lambda sensor requires to switch over from rich to lean or from lean to rich, is measured.

By way of example, the measurement may be performed with a clocked time counter. At the switchover from rich to lean, the elapsed-time counter remains at zero as long as the lambda sensor signal is above a rich threshold.

If it drops below the rich threshold, then the time counter begins to run. It stops again once the lambda sensor signal has dropped below the lean threshold.

At the switchover from lean to rich, the elapsed-time counter remains at zero as long as the lambda sensor signal is below the lean threshold.

If it rises above the lean threshold, then the time counter begins to run. It stops again when the lambda sensor signal rises above the rich threshold. A predeterminable fraction of the maximum value of the lambda sensor signal is defined as the rich and lean thresholds. For instance, 90% of the maximum value is assumed as the rich threshold, and 10% of the maximum value is assumed as the lean threshold. Instead of the most recent measured individual maximum value or minimum value, it is also possible to use the value obtained through a sliding averaging from the respective last actually measured values.

As is indicated in a method step S2, the switchover event is monitored at turning points. A turning point occurs if in the event of switching from rich to lean the actually steadily diminishing lambda sensor signal suddenly becomes larger again, or in the event of switching from lean to rich, the actually steadily increasing lambda sensor signal suddenly becomes smaller again. If a turning point is thus recognized, this switching time is no longer used for evaluation.

In a method step S3, monitoring is carried out as to whether or not the engine is in a virtually steady state, that is whether or not the load and rpm have not varied considerably since the last switching time measurement. If such an approximately steady state is not present, then once again the switching time is not used for evaluation.

However, if an approximately steady state is indeed present, then in a method step S4 a check is made as to whether or not the sensor is switching from rich to lean, and if so then a jump is made to a step S5, or if it is switching from lean to rich, in which case a jump is made to a step S9.

In the method step S5, the currently ascertained switching time TS is added to a sum SFM of the switching times that were already ascertained previously.

Then in a method step S6, a switching time limit value FMG is read out from a performance graph, for instance as a function of an aspirated airflow and an rpm of the engine, and is added to a sum SFMG of previously already read-out limit values.

In a method step S7, a counter ZF, which indicates the number of switchovers from rich to lean, is incremented by one.

In a method step S8, a check is made as to whether or not the value of the counter ZF is less than a predeterminable trip value ZFA that defines the length of the test cycle. If that is the case, then a return is made to the start of the method. However, if the value is greater than or equal to the trip value, then in a method step S14 a check is made as to whether or not the sum of ascertained switching times SFM from rich to lean is less than the limit value SFMG. If so, then in a method step S16 an indication is issued that the lambda sensor is functioning properly. However, if the ascertained total value SFM is greater than or equal to the limit value SFMG, then in a method step S15 an indication is made that the lambda sensor is defective.

In both cases, the counters and summands are reset in a method step S17, and then if new monitoring of the lambda sensor is intended to take place, a return to the start of the method is made.

Conversely, if it is found in the method step S4 that the sensor is switching from lean to rich, then a jump is made to a method step S9.

In the method step S9, the currently ascertained switching time TS is added to the sum SMF of switching times that were already ascertained previously.

Then in a method step S10, the switching time limit value MFG is read out from a performance graph, again as a function of the current operating conditions of the engine (for instance from the aspirated air mass and the current rpm), and is added to the total SMFG of previously already read-out limit values.

In a method step S11, the counter ZM, which indicates the number of switchovers from rich to lean, is incremented by one.

In a method step S12, a check is made as to whether or not the value of the counter ZM is less than a trip value ZMA. If that is the case, then a return is made to the start of the method. However, if the value is greater than or equal to the trip value, then in a method step S13 a check is made as to whether or not the sum of ascertained switching times SMF from lean to rich is less than the limit value SMFG. If so, then as was already described above, in the method step S16 an indication is issued that the lambda sensor is functioning properly. However, if the ascertained total value is greater than or equal to the limit value, then as was already described above, in the method step S15 an indication is made that the lambda sensor is defective.

If the lambda sensor is defective, a monitoring of catalyst efficiency, which may possibly be present, is moreover inhibited.

I claim:

1. A method for monitoring lambda sensors, which comprises ascertaining a reference value from a magnitude of switching times under operating conditions of a lambda regulation cycle, in which a sensor signal changes from a rich value to a lean value or from a lean value to a rich value, and classifying a sensor as functioning correctly if the reference value is less than an associated limit value, separately ascertaining the switching times from rich to lean and from lean to rich, forming separate reference values from the switching times, and comparing the separate reference values with separate limit values.

2. The method according to claim 1, which comprises monitoring the sensor only if an internal combustion engine is in a virtually steady-state operating range.

3. The method according to claim 1, which comprises taking a switching time into account only if a course of the sensor signals exhibits no turning points during a switching event.

4. The method according to claim 1, which comprises adding a predeterminable number of switching times to form the reference value.

5. The method according to claim 1, which comprises taking the limit value from a performance graph as a function of an operating point.

6. A method for monitoring a lambda sensor controlling an air-fuel ratio of an internal combustion engine, wherein the lambda sensor issues a sensor signal switching in different directions between maximum and minimum values in respective switching times, the method comprising the steps of:

establishing a switching time required by the sensor signal to change between predefined rich and lean values, adding a predetermined number of switching times to form a reference value, comparing the reference value to a limit value taken in dependence of an operating point of the engine, performing the foregoing steps separately for each direction of switching and only if
the engine is in a virtually steady state condition and
the range of the sensor signal exhibits no turning point, and classifying the sensor as functioning correctly if, for each direction, the respective reference value is less than the respective limit value.

7. The method according to claim 6, which comprises averaging the switching times.

8. The method according to claim 6, which comprises taking the limit value as a function of an aspirated air mass and rpm of an engine.

9. The method according to claim 6, which comprises using a value at which the sensor signal exhibits a predeterminable first fraction of a maximum value thereof as the rich value, and using a value at which the sensor signal exhibits a predeterminable second fraction of a maximum value thereof as the lean value.

10. The method according to claim 9, which comprises obtaining the maximum value by sliding averaging of most recently measured maximum values.

11. A method for monitoring lambda sensors, which comprises ascertaining a reference value from a magnitude of switching times under operating conditions of a lambda regulation cycle, in which a sensor signal changes from a rich value to a lean value or from a lean value to a rich value, and classifying a sensor as functioning correctly if the reference value is less than an associated limit value, using a value at which the sensor signal exhibits a predeterminable first fraction of a maximum value thereof as the rich value, and using a value at which the sensor signal exhibits a predeterminable second fraction of a maximum value thereof as the lean value.

12. A method for monitoring lambda sensors, which comprises ascertaining a reference value from a magnitude of switching times under operating conditions of a lambda regulation cycle, in which a sensor signal changes from a rich value to a lean value or from a lean value to a rich value, and classifying a sensor as functioning correctly if the reference value is less than an associated limit value, using a value at which the sensor signal exhibits a predeterminable first fraction of a value obtained by sliding averaging of most recently measured maximum values as the rich value, and using a value at which the sensor signal exhibits a second fraction of the value obtained by sliding averaging of the most recently measured maximum values as the lean value.

* * * * *